United States Patent [19]

Drabing

[11] Patent Number: 4,901,647
[45] Date of Patent: Feb. 20, 1990

[54] MOTORCYCLE MANEUVERING DEVICE

[76] Inventor: Charles W. Drabing, P.O. Box 59, Loogootee, Ind. 47553

[21] Appl. No.: 177,372

[22] Filed: Apr. 1, 1988

Related U.S. Application Data

[63] Continuation-in-part of Ser. No. 886,032, Jul. 10, 1986, abandoned.

[51] Int. Cl.⁴ ............................................. B60S 13/02
[52] U.S. Cl. ...................................... 104/44; 104/45; 104/46; 414/537; 414/744.2
[58] Field of Search .................. 104/35, 36, 37, 38, 104/39, 40, 41, 42, 43, 44, 45; 414/744.2, 737, 738, 537

[56] References Cited

U.S. PATENT DOCUMENTS

| | | | |
|---|---|---|---|
| 936,854 | 10/1909 | Beattie | 104/44 |
| 1,234,033 | 7/1917 | Iseman | 104/44 |
| 1,291,747 | 1/1919 | Brain | 104/46 |
| 1,532,728 | 4/1925 | Brobst | 104/44 |
| 1,562,853 | 11/1925 | Schonberger | 104/45 |
| 2,337,670 | 12/1943 | Le Tourneau | 104/45 |
| 2,779,642 | 1/1957 | Matthews . | |
| 2,898,163 | 8/1959 | McMahan . | |
| 2,952,221 | 9/1960 | Hobel | 104/44 X |
| 3,199,826 | 8/1962 | Miller et al. . | |
| 3,526,214 | 10/1970 | Sorg | 414/537 |
| 3,583,326 | 6/1971 | Poissant | 104/44 |
| 3,690,481 | 9/1972 | Pelletier | 414/537 |
| 3,728,970 | 4/1973 | Christensen | 104/44 |
| 3,757,972 | 9/1973 | Martin | 414/537 |
| 3,778,971 | 4/1973 | Merrick | 104/44 |
| 4,109,809 | 8/1978 | Clark | 414/491 |
| 4,401,287 | 8/1983 | Moesner . | |

FOREIGN PATENT DOCUMENTS

| | | | |
|---|---|---|---|
| 474204 | 2/1915 | France | 104/45 |
| 644765 | 10/1928 | France | 104/44 |
| 777574 | 2/1935 | France | 104/45 |
| 131559 | 8/1919 | United Kingdom | 104/44 |
| 1408575 | 10/1975 | United Kingdom | 104/44 |

Primary Examiner—Frank E. Werner

[57] ABSTRACT

The maneuvering device of the invention is designed to enable a motorcycle rider to handle his machine in limited storage space. Primarily, it consists of a platform supported on a center swivel that enables the rider to rotate the platform to any desired position after mounting the platform.

4 Claims, 2 Drawing Sheets

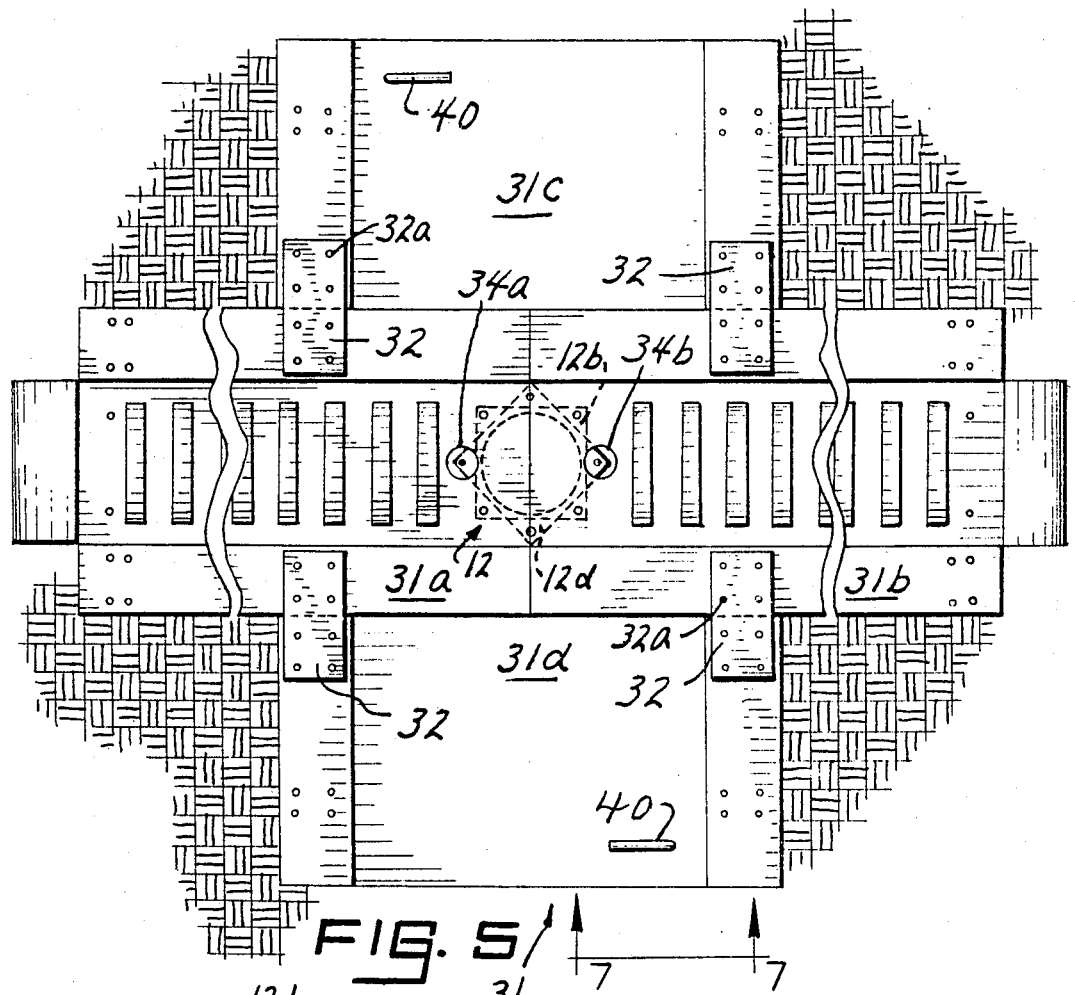
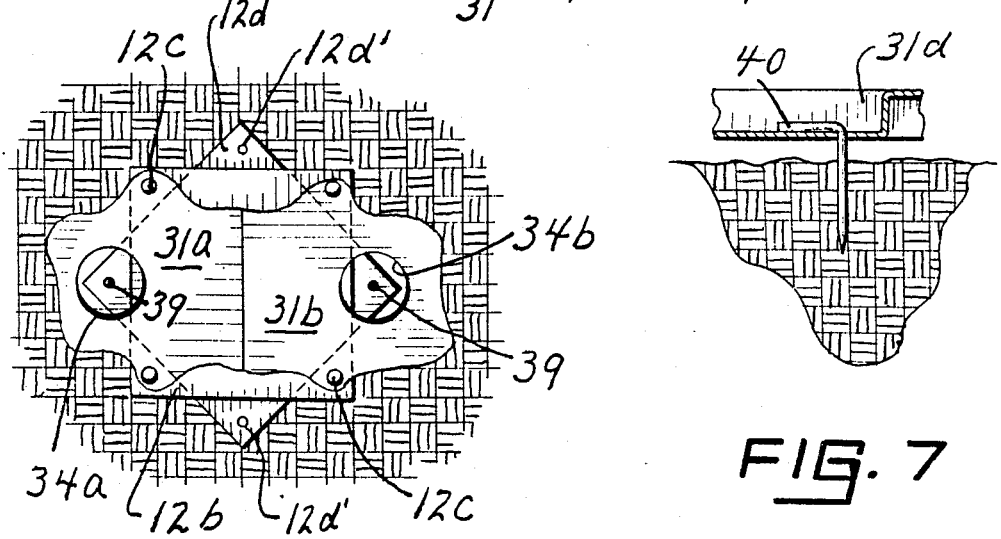

MOTORCYCLE MANEUVERING DEVICE

The present application is a continuation-in-part application of now abandoned application Ser. No. 886,032, filed July 10, 1986, with the same title and inventor.

BACKGROUND OF THE INVENTION

1. Field of the Invention

The invention relates to parking devices for automotive vehicles, and more particularly to a motorcycle maneuvering device.

It is oftentimes difficult for a motorcycle rider to handle his or her vehicle in a limited storage area. The device in accordance with the present invention is designed to permit a rider to handle his or her machine in limited storage space, where, heretofore, such required troublesome maneuvering to effect storage or removal of the machine or vehicle from storage.

The principal object of the invention is to provide a motorcycle maneuvering device which will be of such design as to enable a motorcycle rider to turn his machine around to permit easy parking of it in limited storage areas.

Another object of the invention is to provide a motorcycle maneuvering device which will be of such design as to enable a rider to drive upon it and then spin the machine around to a desired position and drive off of it, and the device will also prevent a rider from having to back the machine downgrade or in narrow areas.

BRIEF DESCRIPTION OF THE DRAWINGS

FIG. 5 is a top plan view of another modified form of the invention;

FIG. 6 is an enlarged plan view, partly fragmentary, detailing the swivel arrangement; and, FIG. 7 is a view in side elevation, looking in the direction of the arrows 7—7 on FIG. 5, detailing a typical platform pinning arrangement.

SUMMARY OF THE INVENTION

Figure 1:
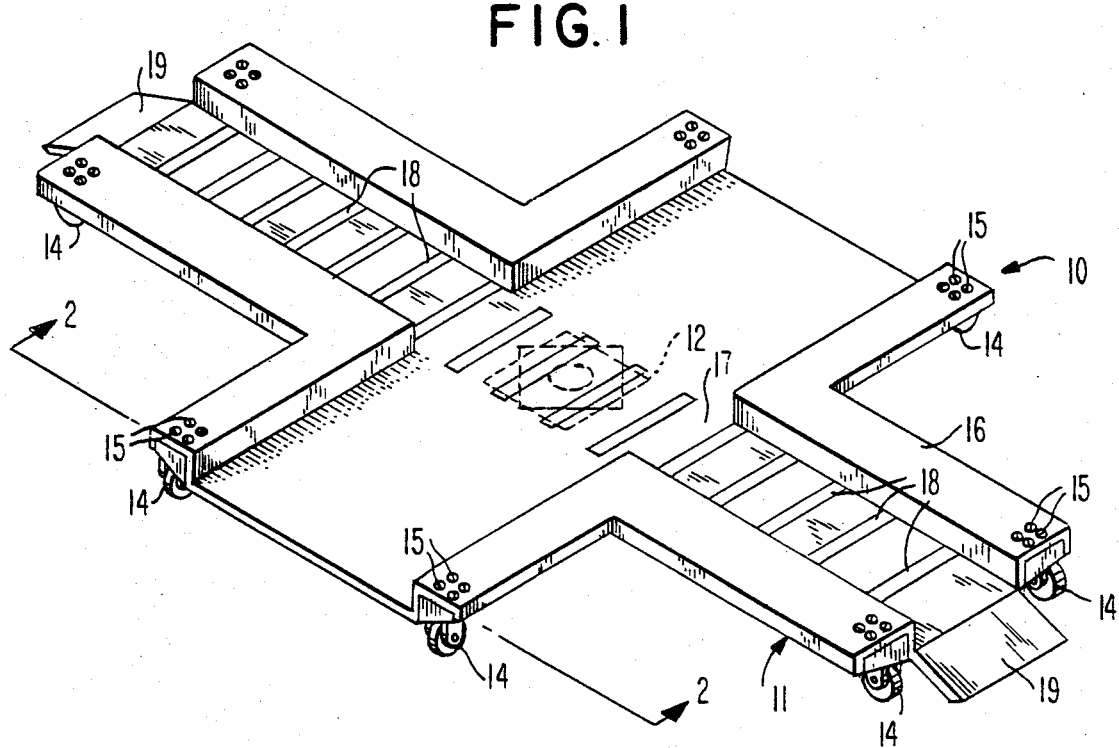
FIG. 1 is a perspective view of the present invention.
Figure 2:
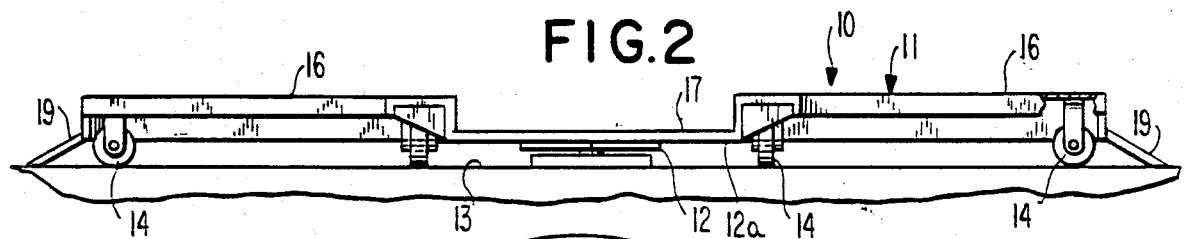
FIG. 2 is a view taken along line 2—2 of FIG. 1.

A motorcycle maneuvering device comprising a platform with ramp means at each end and mounted to a swivel for its rotation when a rider drives his machine upon it. The device also is provided with wheels for rolling engagement with the ground.

DETAILED DESCRIPTION

Accordingly, a device 10 is shown to include a cross-shaped platform 11 having a swivel 12 suitably secured to the center of its bottom surface 12a for engagement with the ground 13 to enable the platform to rotate. Casters 14 are also provided on the bottom corners of platform 11 for engagement with the ground and are secured thereto by fasteners 15. Rail portions 16 are provided and are integrally attached to the side portions of platform 11, and the longitudinal runway portion of the top surface 17 is provided with spaced cleats 18 for preventing slipping of the tires of a motorcycle when it mounts platform 11. A sloped ramp 19 is also provided on each end of the longitudinal runway portion of platform 11 for enabling the motorcycle to mount and descend therefrom.

In use, a rider drives his machine up one of the ramps 19 and onto the top surface 17. The rider then, with his feet, rotates the device 10 to any desired position.

Figure 3:
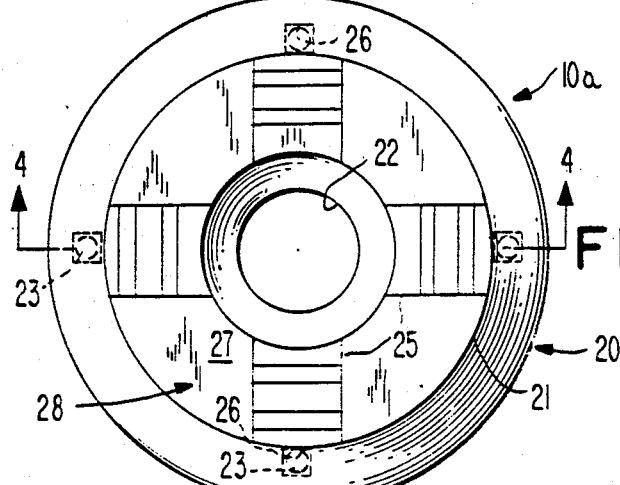
FIG. 3 is a top plan view of a modified form of the invention.
Figure 4:
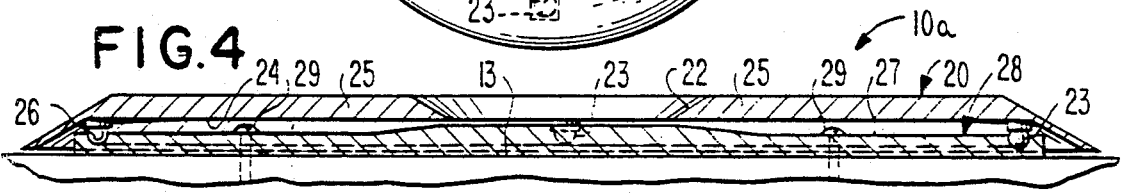
FIG. 4 is a cross-sectional view, taken along line 4—4 on FIG. 3.

Referring now to FIGS. 3 and 4, a modified form of device 10a is shown to include a platform 20 of circular configuration which is beveled at its top outer surface for enabling easy mounting of the wheels of a motorcycle. An opening 21 and an opening 22 are provided through platform 20, and the opening 21 enables a rider to rotate platform 20 with one foot while mounted upon his machine. Four ball casters 23 are secured to the bottom surface 24 of platform 11 adjacent to equally and radially spaced runways 25 that are integrally attached to platform 20 around the opening 21, and the ball casters 23 are in rolling engagement with an annular groove 26 provided in the top 27 of a base plate 28 which is secured to ground 13 by fasteners or anchor bolts 29.

In use, the modified form 20 functions in the same manner as was described of device 10, with the exception that base plate 28 is anchored to the ground 13 and the platform is supported and rotatable on ball casters 23 in groove 26.

In the invention form of FIGS. 5, 6 and 7, the cross-shaped or crucifix platform 31 is separable into longitudinal sections 31a, 31b and lateral sections 31c, 31d. Assembly is accomplished through plate members 32, typically secured by nuts and bolts 32a, and by the securement of upper plate 12b of the swivel or "lazy susan" 12, by nuts and bolts 12c, to the undersurface of longitudinal sections 31a, 31b. In other words, plate members 32 and upper plate 12b respectively combine to present assembled sections defining platform 31.

Additionally, and evident in both FIGS. 5 and 6, longitudinal sections 31a, 31b of platform 31 include openings 34a and 34b, respectively, the latter serving importance in securement of the swivel or "lazy susan" 12 to the ground or other supporting surface. In this connection, lower plate 12d of the swivel or "lazy susan" 12 is so positioned that stakes 39 (only two shown) can be introduced into and through each, and then into a securement with the supporting surface.

As particularly evident in FIG. 6, the plate 12d has openings 12d' proximate each corner for receiving the aforesaid stakes 39. In order to accomplish complete staking, the platform 31 is rotated so that the unstaked openings 12d' in plate 12d are visable through openings 34a, 34b. Thus, four corner positive placement is assured.

Further, and with respect to FIG. 7 (and also FIG. 5), pin members 40 are provided, in lateral sections 31c, 31d, for ground engagement - where such pin members 40 are removed when platform 31 is rotated, for example, for motorcycle removal. The latter is accomplished by pushing action by the operator when off the motorcycle and adjacent the platform 31. Without pinning, the platform 31 would move in an uncontrolled manner, particularly, when driving the motorcycle thereon.

While various changes may be made in the detailed construction, such changes will be within the spirit and scope of the present invention, as defined by the appended claims:

I claim:

1. A motorcycle maneuvering device comprising a base plate anchored to a support surface, a circular platform receded above said base plate for rotating said motorcycle three hundred sixty degrees when mounted on said base plate, and caster means secured to said platform for supporting said platform on said base plate, where an opening provided through said platform selectively receives an operator's foot for engagement with the top surface of said base plate and enables an operator to rotate said platform mounted motorcycle on said caster means, where a central open area provided in said top surface of said platform has a chamfered edge for ready motorcycle travel thereover, where said caster means are equally and radially spaced apart and fixedly secured to the bottom surface of said platform, where said caster means are in rolling engagement with an annular groove provided in said top surface of said base plate, where an outer portion of said top surface of said platform is chamfered and serves as a ramp receiving the wheels of said motorcycle during entry and exit from said platform, and where said platform is removable from said base plate by elevating motion.

2. A motorcycle maneuvering device comprising a motorcycle receiving platform in the shape of a crucifix, said platform defined by separable longitudinal and lateral sections, a swivel arrangement including swivel means disposed between an upper plate and a lower plate said lower plate of said swivel arrangement positioned on a supporting surface, said upper plate of said swivel arrangement serving to assemble said separable longitudinal sections of said platform and other plate members serving to assemble said separable lateral sections of said platform with said separable longitudinal sections of said platform, said lower plate of said swivel arrangement including openings revealing said supporting surface, anchoring means extending through said openings in said lower plate to secure the latter on said supporting surface, and openings in said separable longitudinal sections of said platform proximate said upper plate of said swivel arrangement selectively providing entry for said anchoring means to said openings in said lower plate upon rotation of said platform.

3. The motorcycle maneuvering device of claim 2 where said means extending through one of said separable sections and into said supporting surface selectively anchor said platform against rotational movement.

4. The motorcycle maneuvering device of claim 3 where said extending means is a pin.

* * * * *